US012705793B2

(12) United States Patent
Pignol et al.

(10) Patent No.: US 12,705,793 B2
(45) Date of Patent: Aug. 11, 2026

(54) IMAGING SYSTEM AND METHOD FOR ATTITUDE DETERMINATION

(71) Applicant: Urugus S.A., Montevideo (UY)

(72) Inventors: Florian Pignol, Antigua Guatemala (GT); Manuel Díaz Ramos, Buenos Aires (AR); Matias Graña, Buenos Aires (AR)

(73) Assignee: Urugus S.A., Montevideo (UY)

( * ) Notice: Subject to any disclaimer, the term of this patent is extended or adjusted under 35 U.S.C. 154(b) by 499 days.

(21) Appl. No.: 18/090,382

(22) Filed: Dec. 28, 2022

(65) Prior Publication Data

US 2023/0215039 A1 Jul. 6, 2023

(30) Foreign Application Priority Data

Dec. 30, 2021 (EP) .................................... 21218384

(51) Int. Cl.
*G06T 7/73* (2017.01)
*G06T 7/20* (2017.01)

(52) U.S. Cl.
CPC .................. *G06T 7/74* (2017.01); *G06T 7/20* (2013.01); *G06T 2207/10032* (2013.01); *G06T 2207/20076* (2013.01); *G06T 2207/30252* (2013.01)

(58) Field of Classification Search
None
See application file for complete search history.

(56) References Cited

U.S. PATENT DOCUMENTS 10,657,371 B1 5/2020 Thompson et al.
2007/0038374 A1 2/2007 Belenkii et al.
2008/0046138 A1* 2/2008 Fowell .................. B64G 1/244 701/13

(Continued)

FOREIGN PATENT DOCUMENTS

EP 3499452 A1 6/2019

OTHER PUBLICATIONS

Zingarelli et al., "Improving the Space Surveillance Telescope's Performance Using Multi-Hypothesis Testing", DOI: 10.1088/0004-6256/147/5/111 (Year: 2014).*

(Continued)

*Primary Examiner* — Chan S Park
*Assistant Examiner* — Promotto Tajrian Islam
(74) *Attorney, Agent, or Firm* — Lee & Hayes, P.C.

(57) ABSTRACT

The subject matter disclosed herein is generally directed towards systems and methods for estimating vehicle attitude information using position data of stars and astronomical objects in the sky. Considerable advantages may be realized by equipping vehicles with low-cost star trackers adequate for filtering images based on statistical-based techniques, which could provide a robust and reliable attitude determination. The methods described herein provide algorithms to reduce the amount of processing capacity and memory for finding stars and astronomical objects. In some instances, the provided systems and methods allow the prediction of the next location of the stars and/or other astronomical objects to enhance the search by looking for them at the predicted location. The algorithms may be applied in real-time and are suitable for movable platforms with limited resources such as satellites and spacecraft.

16 Claims, 5 Drawing Sheets

(56) References Cited

U.S. PATENT DOCUMENTS

| | | | | |
|---|---|---|---|---|
| 2018/0005353 | A1* | 1/2018 | Kounavis | G06V 10/507 |
| 2021/0225011 | A1* | 7/2021 | Nguyen | G06T 7/74 |
| 2022/0084217 | A1* | 3/2022 | Cidonio | B64G 1/244 |

OTHER PUBLICATIONS

Kirk et al., "Multi-hypothesis Test Detection for Star Tracking Systems", DOI: 10.2514/6.2021-1100 (Year: 2021).*
Watkins,. "Topic 15: Maximum Likelihood Estimation" (Year: 2011).*
Gallager, R., "7.3: Detection, Decisions, and Hypothesis Testing" from "Discrete Stochastic Processes" (Year: 1996).*
The European Search Report, mailed on Jun. 7, 2023, for European Application No. 21218384.2, a counterpart foreign application of the U.S. Appl. No. 18/090,382, 8 pages.
Wang, et al., "Hardware Implementation of Fast and Robust Star Centroid Extraction with Low Resource Cost", IEEE Sensors Journal, IEEE, USA, vol. 15, No. 9, Sep. 1, 2015, pp. 4857-4856.
Zhan, et al., "Accurate and Robust Synchronous Extraction Algorithm for Star Centroid and Nearby Celestial Body Edge", IEEE Access, Sep. 3, 2019, vol. 7, pp. 126742-126752.
Office Action mailed Aug. 6, 2024, from European Patent Application No. 21218384.2, 7 pages.
Lichter Michael J. et al: "Start Tracker Accuracy Improvement and Optimization for Attitude Measurement in Three-Axis," Jan. 1, 2019 (Jan. 1, 2019), XP093187144.

* cited by examiner

FIGURE 3

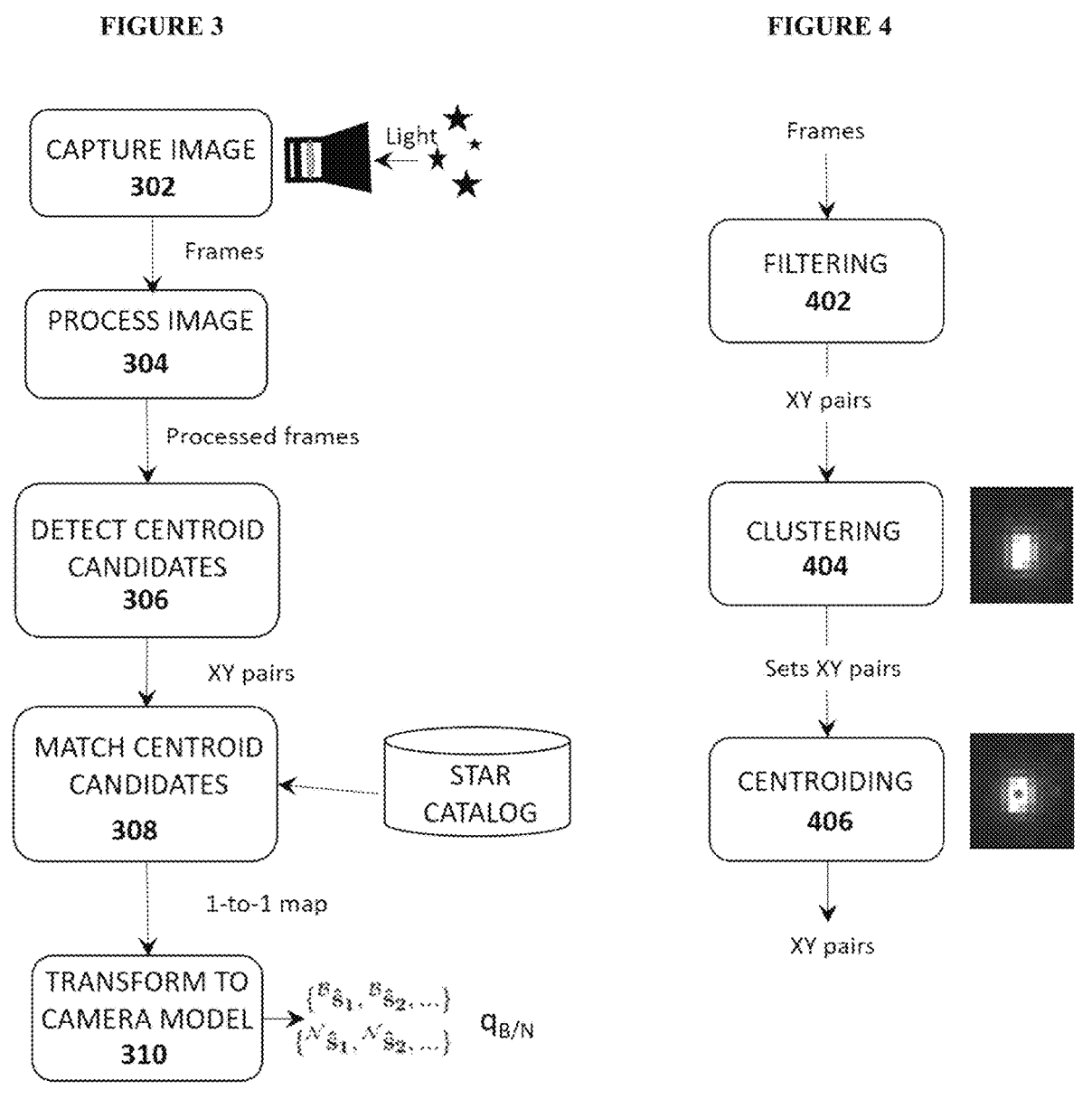

CAPTURE IMAGE 302

Light

Frames

PROCESS IMAGE 304

Processed frames

DETECT CENTROID CANDIDATES 306

XY pairs

MATCH CENTROID CANDIDATES 308

STAR CATALOG 1-to-1 map

TRANSFORM TO CAMERA MODEL 310

$\{{}^{B}\hat{s}_1, {}^{B}\hat{s}_2, \ldots\}$ $\{{}^{N}\hat{s}_1, {}^{N}\hat{s}_2, \ldots\}$ $q_{B/N}$

FIGURE 4

Frames

FILTERING 402

XY pairs

CLUSTERING 404

Sets XY pairs

CENTROIDING 406

XY pairs

IMAGING SYSTEM AND METHOD FOR ATTITUDE DETERMINATION

CROSS REFERENCE TO RELATED APPLICATION

This patent application claims the benefit of and priority to co-pending European Patent Application No. 21218384.2, filed Dec. 30, 2021, entitled "IMAGING SYSTEM AND METHOD FOR ATTITUDE DETERMINATION," which is hereby incorporated herein in its entirety by reference.

BACKGROUND

It is well known that determining the attitude or orientation of an artificial satellite or spacecraft is of fundamental importance for executing their missions. Among the variety of instruments and devices currently used for attitude determination, star trackers are considered the most accurate reference for pointing as they utilize the magnitude of brightness of the fixed stars to identify and then calculate the relative position of stars around it.

In order to provide a reliable and accurate attitude determination, star trackers need to cope with several sources of errors including those originated from the electro-optical components of the star tracker system, the degree of spurious sources of light that contaminate the frames, and the star identification process involving star detection, matching and identification using sensors having low signal-to-noise ratios. This need becomes critical when "low cost" satellites are designed, requiring compact and lighter instruments and optimized power consumption.

SUMMARY

An image captured by an imaging sensor on board a vehicle may be used to determine the orientation of the vehicle with respect to a fixed or generally known frame of reference, irrespective of the orientation of any observer. The fixed or generally known frame of reference is usually referred to as the inertial frame of reference (e.g. Earth-centered inertial (ECI) frame) and the frame of reference of the vehicle is usually referred to as the body frame of reference. For spacecraft attitude determination, star trackers (a type of spacecraft-based imaging system) usually obtain an image of the stars, measure their apparent position in the field of view of the camera, and identify the stars, so their position can be compared with their known absolute position from a star catalog expressed in the inertial frame of reference. There are several methods to find stars in an image captured by a star tracker onboard a spacecraft or a satellite. If the images have good Signal-to-Noise Ratio (SNR) a standard method is to assess the intensity for each pixel and then establish a threshold. If the level of intensity is above the threshold, the brilliant pixels are classified as star candidates, and if the level of intensity is below the threshold, the pixels are classified as noise. The star candidates are subsequently recognized as stars after looking them up in a star database to determine which of the detected star candidates may be stars and which of these may not. Nevertheless, in "low-cost" satellites which are generally equipped with small, light and off-the-shelf components, the quality of the images captured by the star trackers may be low, frequently presenting a reduction in the SNR, and limiting or reducing the number of detected stars. In images with low SNR, using the mentioned threshold technique may inevitably reduce the accuracy and robustness of detecting stars because very few or even no brilliant pixels may have a level of brightness or intensity above the set threshold. Furthermore, in situations in which spurious light reflections are projected into the field of view, the thresholding method typically fails. Considerable advantages may be realized by equipping satellites with low-cost star trackers adequate for filtering images based at least in part on statistical-based techniques, which could provide a robust and reliable attitude determination despite the satellite's limited resources, as provided by the systems and methods disclosed herein.

Further features and advantages, as well as the structure and operation of various embodiments are described in detail below, with reference to the accompanying drawings. It is noted that the disclosure of the systems, methods and devices described herein is not limited to the specific embodiments described herein. Such embodiments are presented herein for illustrative purposes only. Additional embodiments will be apparent to persons skilled in the relevant art(s), based on the teachings contained herein.

BRIEF DESCRIPTION OF THE DRAWINGS

The Detailed Description is set forth with reference to the accompanying figures. In the figures, the leftmost digit(s) of a reference number identifies the figure in which the reference number first appears. The use of the same reference numbers in different figures indicates similar or identical items

FIG. 3 is a flow diagram showing some steps of an example process for spacecraft attitude determination using star tracker data, according to embodiments of present disclosure.

FIG. 4 is a flow diagram showing some steps of an example process for detecting one or more centroid candidates, according to embodiments of present disclosure.

DETAILED DESCRIPTION OF EMBODIMENTS

Figure 1:
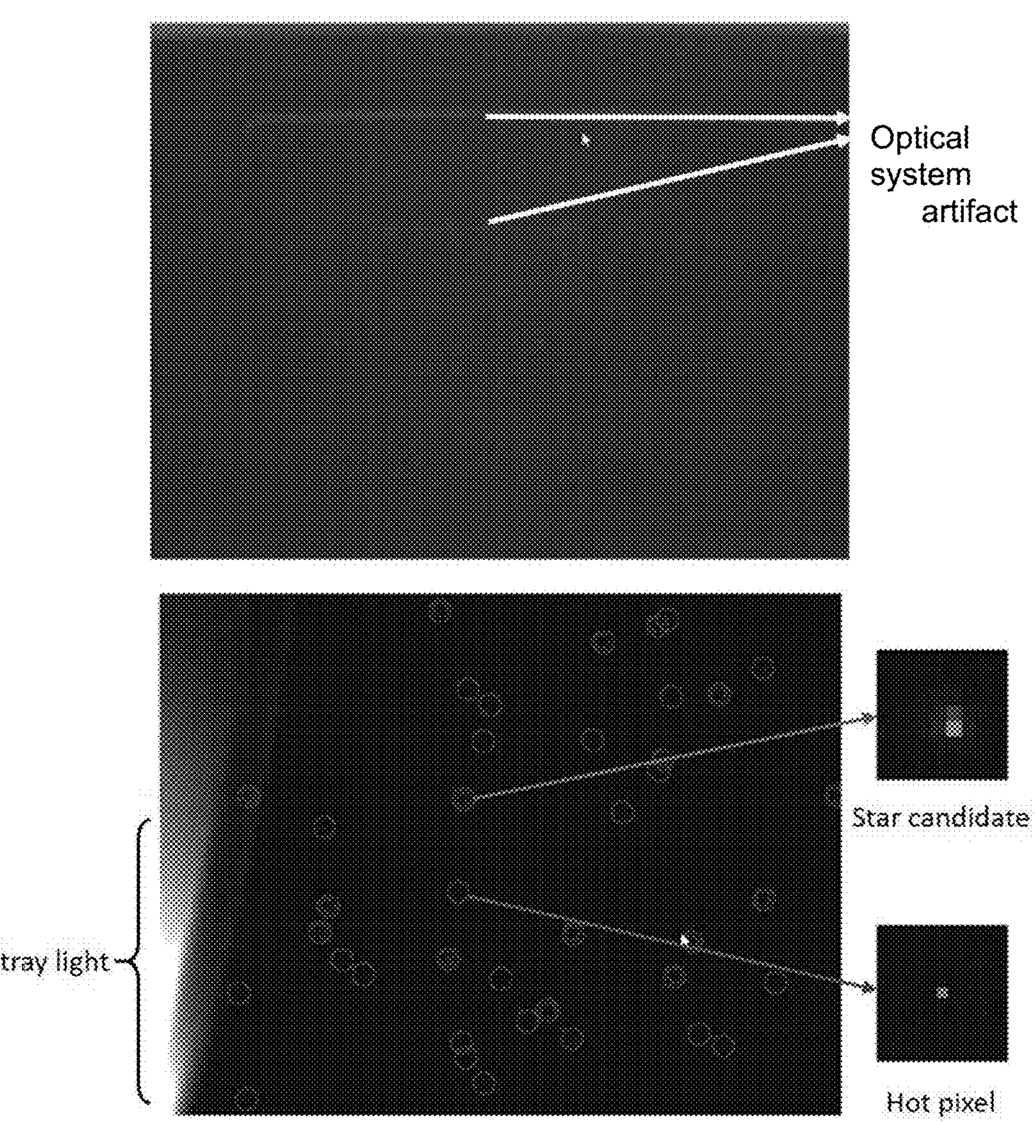
FIG. 1 shows an image captured by a star tracker on board a satellite having bright spots, spurious sources of light and artifacts.

The present disclosure provides an imaging system for attitude determination, the imaging system comprising: one or more imaging sensors comprising a plurality of pixel sensors and configured to capture at least one image having a plurality of pixels; and one or more processors, configured to: instruct the one or more imaging sensors to capture the at least one image having a plurality of pixels; filter the at least one image, based at least in part on statistical-based techniques, to detect one or more centroid candidates; identify, based at least in part on the one or more centroid candidates, one or more stars; generate a mapping between the one or more stars and the one or more centroid candidates; and estimate the attitude, based on the mapping.

The systems, methods and devices described herein thus allow for attitude determination using star detection by capturing an image and performing a filtering step of the captured image based at least in part on statistical-based techniques, wherein the filtering step allows detecting centroid candidates. This filtering step based on statistical-based techniques may thus allow to filter out unwanted and/or interfering elements of the image, and provide for a "cleaner" filtered image upon which a more accurate detection of centroid candidates can be done, even when the captured images have relatively low SNR.

According to embodiments, for filtering the at least one image based at least in part on statistical-based techniques, the one or more processors are configured to filter some or all the pixels of the plurality of pixels of the at least one image based at least in part on a hypothesis test. The one or more processors may be configured to filter the at least one image based at least in part on statistical-based techniques, to detect one or more centroid candidates, by filtering some or all the pixels of the plurality of pixels of the at least one image based at least in part on a hypothesis test.

The systems, methods and devices described herein thus allow to compute statistical values to test one or more hypotheses to determine centroid candidate(s) in a window of the image, and not necessarily in the whole image.

According to embodiments, the hypothesis test comprises computing statistical values in a window to test two or more hypotheses, to determine centroid candidates, the window having a size of one or more pixels. In some instances, statistical parameters are computed to determine which hypothesis of the two or more hypotheses is the one with maximum likelihood, and the two or more hypotheses having a maximum likelihood of occurrence are selected for use as explained elsewhere in the Detailed Description.

According to embodiments, the one or more processors are configured to slide the window over the at least one image to compute the statistical values in all the pixels of the at least one image or in selected one or more sub-regions of the at least one image.

According to embodiments, the one or more processors are configured to slide the window over the at least one image from a first position to a second position by one pixel at a time such that the relative displacement from the first position to the second position is the size of a pixel or a multiple thereof, and the pixels of the window in the first position overlap by at least one pixel the pixels of the window in the second position.

By sliding the window over the at least one image, the pixel or plurality of pixels which the window covers will vary as the window changes positions when it is slid over the at least one image. This may allow the statistical values to be computed for the different positions of the window, so not only once for the whole image but independently for each position of the window on the at least one image. This may in turn allow to adapt to varying noise levels on the image, because it may allow to take into account the noise independently for each window, and may in turn allow for a more robust centroid detection. In addition, by sliding the window one pixel at a time, the position of the centroid candidate can be detected with more precision.

According to embodiments, for computing the statistical values, the one or more processors are configured to perform at least one of: computing a likelihood of occurrence of a hypothesis, computing a likelihood metric, or determining whether a likelihood metric satisfies a predetermined condition.

According to embodiments, computing the likelihood metric comprises weighting or relating the likelihood of occurrence of two or more hypotheses.

According to embodiments, computing the likelihood of occurrence of a hypothesis comprises: setting a hypothesis model; estimating statistical parameters of the hypothesis model based at least in part on a pixel parameter, wherein the statistical parameters are estimated so that the hypothesis has a maximum likelihood of occurrence; and computing the likelihood of the hypothesis by based at least in part on the statistical parameters.

The systems, methods and devices described herein thus make use of hypothesis determination and test in order to estimate whether a centroid candidate is located in the window being analyzed. The hypothesis model is set, and statistical parameters of the hypothesis model are estimated based at least in part on a pixel parameter, or a parameter associated with a pixel, such as with the intensity of a pixel. With the statistical parameters, the likelihood of the hypothesis can be determined based on the model of the hypothesis. In some instances, the statistical parameters of the hypothesis model are estimated so that the hypothesis has a maximum likelihood of occurrence. This allows to estimate, for each pixel or group of pixels in the window, the likelihood of a centroid candidate being present. By performing this hypothesis test for the window, which may be slid over the image, the hypothesis test may be adapted to the different pixel parameters of the pixels of each window, thereby adapting to the different levels of noise which may be present in different regions of the image.

According to embodiments, a first hypothesis is set as a null hypothesis and is modeled based on a statistical distribution; and a second hypothesis is set as an alternative hypothesis and is modeled based at least in part on a star characteristic including star shape, star quantity or star magnitude.

According to embodiments, the statistical distribution represents image noise and comprises at least one of a normal or Gaussian distribution, a Poisson distribution, or a statistical distribution modeling stray light; and a model of the second hypothesis comprises a combination of a function representing a star shape and a statistical distribution representing image noise; the function representing the star shape comprising at least one of a Gaussian bell, a saturated Gaussian bell, a sinc function, a square waveform, a rectangular waveform, a sawtooth waveform, or a triangle waveform.

By computing the likelihood of occurrence of the first hypothesis and of the second hypothesis, by modeling the first hypothesis as a statistical distribution and by modeling the second hypothesis based on a star characteristic, an estimation can be obtained of which of the two hypotheses is more likely (that there is no star or that there is a star). In addition, by modeling the first hypothesis as a statistical distribution representing image noise, and modeling the second hypothesis as a combination of a function representing a star shape and a statistical distribution representing image noise, it can efficiently be discriminated between noise and centroid candidates, and the determination of a centroid candidate may not be affected by the fact that noise is different in different parts of the image.

According to embodiments, the one or more processors are further configured to compute the likelihood metric and the computation comprises calculating a quotient of the likelihood of occurrence of the second hypothesis divided by the likelihood of occurrence of the first hypothesis.

Performing said quotient may allow to obtain a certain normalization to adapt to the different amount of noise present in different parts of the image, which may even have a different order of magnitude for different parts of the image.

According to embodiments, to determine whether the likelihood metric satisfies a predetermined condition to detect one or more centroid candidates, the one or more processors are configured to determine whether the likelihood metric is above, equal or below a threshold value.

According to embodiments, the threshold value is determined as a fixed value for all the windows or pixels in the at least one image, or as a variable value different for different pixels or windows in the at least one image, or a combination thereof.

According to embodiments, the fixed threshold value is determined based at least in part on a multiple of the standard noise value of some or all of the pixels on the at least one image, as a statistical noise estimate, or as a local noise estimate determined on the fly.

According to embodiments, the variable threshold value is determined based at least in part on a Bayesian interpretation associated with the likelihood metric, and wherein computing the likelihood metric comprises calculating a quotient between two a priori probabilities associated with the presence of a centroid candidate.

According to embodiments, the one or more processors are further configured to reduce the noise present on the at least one image by employing algorithms including the removal of hot or dead pixels, the smoothing of the data using Photo Response Non Uniformity, PRNU, or checking the intensity level of the plurality of pixel sensors.

According to embodiments, the one or more processors are configured to determine the one or more sub-regions based at least in part on a hint, the hint including an attitude hint or a centroid hint.

By making use of a hint which may provide information about the sub-regions to be used to slide the window, time and computational power are reduced because there is no need to slide the window over the whole image, but it can be simply moved to the specific sub-regions indicated by the hint.

According to embodiments, the one or more processors are further configured to determine the attitude hint, comprising: before capturing the at least one image, capturing a plurality of subsequent images; determining, based at least in part on a first image and a second image of the plurality of subsequent images, a first order angular velocity estimate; and determining, based at least in part upon the first order angular velocity estimate, an attitude estimate associated to the at least one image, to obtain the attitude hint.

If previous images have been captured before the at least one image, the attitude hint may be determined for the at least one image, and said attitude hint can be used to determine in which specific sub-region(s) of the images the window is to be placed because it is expected that a centroid candidate is located in said sub-region(s). Said attitude hint may be determined by knowing the attitude of a first image, the attitude of a second image, both of which captured before the at least one image, and by knowing the time between the moments in which the images were captured, because based on that a first order angular velocity that the vehicle had between the first and the second image can be estimated. By assuming that the angular velocity was kept substantially constant between the second image and the at least one image, an attitude estimate of the at least one image can be determined, which can provide approximate information about the sub-region(s) on the at least one image where the centroid candidates are going to be, and can be used as the attitude hint.

According to embodiments, the imaging system further comprises a module for focusing light and a module for filtering out stray light.

According to embodiments, the imaging system is all or partially on-board a movable platform including a manned or unmanned aerial, spatial, maritime or terrestrial vehicle.

The present disclosure further provides a method for attitude determination of a vehicle, comprising: detecting one or more centroid candidates in at least one image by filtering the at least one image based at least in part on statistical-based techniques; matching the one or more centroid candidates to astronomical objects to obtain matches; determining, based on the matches, a transformation factor; and determining, based on the transformation factor, the attitude of the vehicle.

According to embodiments, the method further comprises at least one of removing background noise from the at least one image, clustering pixels from the at least one image to obtain clusters, and determining cluster centroids to obtain centroid candidates.

According to embodiments, the method further comprises capturing at least one image by an imaging system on-board the vehicle, the vehicle a manned or unmanned aerial, spatial, maritime or terrestrial vehicle.

According to embodiments, the statistical-based techniques comprise a hypothesis test technique, and filtering the at least one image based at least in part on statistical-based techniques comprises: setting one or more hypotheses model; estimating statistical parameters of the one or more hypotheses based at least in part on a pixel parameter; computing a likelihood of occurrence of the one or more hypotheses; computing a likelihood metric relating the likelihood of occurrence of one or more hypotheses; and determining whether the likelihood metric satisfies a predetermined condition to detect one or more centroid candidates.

According to embodiments, a first hypothesis of the one or more hypotheses is set as a null hypothesis and is modeled based on a statistical distribution; and a second hypothesis of the one or more hypotheses is set as an alternative hypothesis and is modeled based at least in part on a star characteristic including star shape, star quantity or star magnitude.

According to embodiments, the statistical distribution represents image noise and comprises at least one of a normal or Gaussian distribution, a Poisson distribution, or a statistical distribution modeling stray light; and a model of the second hypothesis comprises a combination of a function representing a star shape and a statistical distribution representing image noise; the function representing the star shape comprising at least one of a Gaussian bell, a saturated Gaussian bell, a sinc function, a square waveform, a rectangular waveform, a sawtooth waveform, or a triangle waveform.

According to embodiments, computing a likelihood metric comprises calculating a quotient of the likelihood of occurrence of the second hypothesis divided by the likelihood of occurrence of the first hypothesis.

According to embodiments, determining whether a likelihood metric satisfies a predetermined condition to detect one or more centroid candidates comprises determining whether the likelihood metric is above, equal or below a threshold value.

According to embodiments, the threshold value is determined as a fixed value for all the windows or pixels in the image, or as a variable value different for different pixels or windows in the image, or a combination thereof.

According to embodiments, the fixed threshold value is determined based at least in part on a multiple of the standard noise value of some or all of the pixels on the image, as a statistical noise estimate, or as a local noise estimate determined on the fly.

According to embodiments, the variable threshold value is determined based at least in part on a Bayesian interpretation associated with the likelihood metric, and wherein the likelihood metric is computed by calculating a quotient between two a priori probabilities associated with the presence of a centroid candidate.

According to embodiments, some or all the pixels of the at least one image are filtered based at least in part on the hypothesis test technique using a window having a size of one or more pixels.

According to embodiments, the window is slid over the at least one image from a first position to a second position by one pixel at a time such that the relative displacement from the first position to the second position is the size of a pixel or a multiple thereof, and the pixels of the window in the first position overlap by at least one pixel the pixels of the window in the second position.

According to embodiments, the window is slid over the at least one image to filter all the pixels of the at least one image or selected one or more sub-regions of the at least one image.

According to embodiments, the one or more sub-regions are determined based at least in part on a hint, the hint including an attitude hint or a centroid hint.

According to embodiments, the method further comprises: before capturing the at least one image, capturing a plurality of subsequent images; determining, based at least in part on a first image and a second image of the plurality of subsequent images, a first order angular velocity estimate; and determining, based at least in part upon the first order angular velocity estimate, an attitude estimate associated to the at least one image, to obtain the attitude hint.

The present disclosure further provides a method for filtering an image comprising a plurality of pixels, the method comprising: setting a hypothesis model based on a pixel parameter; estimating statistical parameters of the hypothesis model based at least in part on the pixel parameter, wherein the statistical parameters are estimated so that the hypothesis has a maximum likelihood of occurrence; and computing at least one of a likelihood of occurrence of a hypothesis or a likelihood metric, based at least in part on the statistical parameters. The method may be performed pixel by pixel or by group of pixels.

According to embodiments, the method further comprises setting a value for the pixel parameter based at least in part on the likelihood of occurrence of the hypothesis or the likelihood metric.

According to embodiments, the method further comprises determining whether a likelihood metric satisfies a predetermined condition.

According to embodiments, the likelihood metric comprises weighting or relating the likelihood of occurrence of two or more hypotheses.

According to embodiments, the method further comprises computing at least one subpixel center of a star candidate by a center of mass technique applied to the likelihood metric instead of the original brightness (pixel parameter) on the image.

Embodiments include an imaging system onboard a stationary platform or movable platform (e.g. vehicle) comprising an imaging sensor, memories, processors, and employing various computational algorithms in a processing unit (e.g., a processor or other logic circuit) to capture and process images of a starry sky for determining the attitude of the platform on which the imaging system is mounted. The imaging system may further comprise other elements including, but not limited to means or modules or units for focusing light such as lenses, objectives or telescopes, means (modules, units) for filtering out stray light in order to prevent spurious sources of light from reaching the imaging sensor, such as baffles, and so forth. Embodiments mainly illustrate imaging systems on-board aerial, spacecraft or satellite-based imaging systems; however, it should be understood that the imaging system may be mounted or attached to any stationary or movable platform. For example, a ship may employ the imaging system to capture, process and analyze images of the sky in order to determine the orientation of the ship, and may also determine its position by making angle measurements from the earth's horizon.

Embodiments may include capturing, using one or more imaging sensors of a spacecraft or satellite-based imaging system, one or more images (also referred to herein as "image data", "frames" or "video frames"). The images may be processed and/or analyzed in real time or may be stored in a storage media for later processing and/or analysis. In some implementations, the images are processed and analyzed in real time since in a spacecraft or satellite it is important to autonomously estimate, and eventually control, the orientation (attitude) of the spacecraft while it is in orbit, for example when the spacecraft needs to point an antenna towards a ground station or needs to aim the camera of a payload at a specific target. In some instances, the images may be stored and may be subsequently processed to suppress unwanted distortions and/or enhance some important image features.

Embodiments further include analyzing the one or more images to determine at least one centroid candidate, to estimate an angular velocity, and/or to obtain any other analysis results or information that may be gained from analyzing the images captured by the imaging sensors. For example, a star tracker system on board a satellite may capture at least one image of the sky from space. The image may contain bright spots which correspond to stars but may also contain bright spots that, due to the existence of other sources of light, may correspond to the moon, the earth, a spacecraft, or may be the result of artifacts such as hot pixels or veins, as shown in FIG. 1. For this reason, the star tracker system according to embodiments processes the captured images by filtering them with the intention of removing artifacts and analyzes the captured images to determine which bright spots are likely to be stars i.e. centroid candidates or star candidates. The star tracker system may include several imaging sensors, so the processor of the star tracker system may store the images captured by the several imaging sensors, pre-process the images by applying smoothing techniques and remove hot or dark pixels, and may subsequently filter the pre-processed images with a method based on a statistical technique, such as based on a hypothesis test. Filtering the images in this manner provides a substantial advantage since it is possible to detect stars in spite of capturing low quality images or images with low SNR. By not having the need to increase the image quality by hardware, this may allow to reduce the cost and weight of the cameras and imaging sensors on board the satellite. After filtering and optionally further pre-processing the captured images, centroid candidates may be determined as explained elsewhere in this Detailed Description, in order to determine the attitude of the satellite.

Embodiments include methods and systems for filtering images based at least in part on statistical-based techniques. Statistical-based techniques include methods, instructions, approaches, procedures or formulas employed for providing insights about data such as descriptive or inferential statistics for data analysis. In general, methods employed in star trackers use the calculation of mean gray values of pictures, and use the mean gray values as the only input to decide if something is a star candidate or not. The drawbacks of this, are the false positives for hot pixels or radiation from the van Allen belt that may be present or the increased noise due to straylight such as reflections of light coming from either the Earth or the sun, or the false negatives such as very dim stars not properly captured by out-of-the-shelf electronic components. On the contrary, instead of using only mean gray values, the methods and system described herein use statistical-based techniques based, at least in part, on determination and/or evaluations of hypothesis tests. More particularly, the methods and systems for filtering images described herein are based at least in part on evaluations of hypothesis tests. As used herein, the term "attitude" usually refers to the orientation of a platform on which the imaging system or device is mounted relative to a specific frame of reference. The platform may be a stationary or movable platform, such as a manned or unmanned spatial, aerial, terrestrial or maritime vehicle including artificial astronomical objects, satellites, spacecrafts, watercrafts, aircrafts, drones, and so forth.

Embodiments may further include computing statistical values associated with the pixels of the image to test hypotheses in order to determine centroid candidates. The statistical values may include the likelihood of occurrence of the hypotheses, a relationship between the computed likelihood of occurrences, and so forth. As used herein, the term "centroid candidate" usually refers to one or more pixels of the image that satisfy a predetermined condition. In some instances, the predetermined condition may be determined based on a statistical value computed for the pixel or group of pixels of the images. For example, a pixel of an image may be selected as a centroid candidate if a likelihood metric computed based on the level of intensity of the pixel (and in some instances of its neighboring pixels) is above a threshold value.

Embodiments may further include determining hypotheses to be tested. The hypotheses may be set based on pixel properties or parameters such as intensity or gray levels, geometry, shape, local statistics, or other characteristics. For example, the star tracker may set a hypothesis that there is a star based at least in part on an expected shape or intensity profile of a star and may set another hypothesis that there is no star as noise based on the intensity of the pixel(s). The terms intensity and brightness are used interchangeably throughout the Detailed Description.

In a non-limiting example, a star tracker may filter an image to determine centroid candidates and their position on the image, based at least in part on a hypothesis test. The hypothesis test may include computing statistical values and determining whether a likelihood metric is above or below a threshold value. After capturing an image from a starry sky, the likelihood of occurrences of different hypotheses may be computed based on estimating the statistical parameters (e.g. mean value, standard deviation) of the hypotheses being tested, for some or all the pixels or group of pixels of the image. In some instances, the statistical parameters may be estimated in a fast and efficient manner optimizing the computational power by performing one or more convolution operations in two dimensions between matrices including the data from the captured image and the modeled hypotheses.

In some instances, the results of the computed convolutions may provide preliminary evidence of the coordinates on the captured image where there is a high likelihood of occurrence of a hypothesis, such that the position of the maximum values of the result of the convolutions may indicate where the coordinates of the centroid candidates may be located. After estimating the statistical parameters based on the modeled hypotheses and the intensity level (pixel parameter) of pixels or group of pixels of the captured image, a likelihood metric may be calculated. The likelihood metric may represent a relation between the likelihood of occurrences of the hypotheses, for example the quotient of the likelihood of one hypothesis over another. Performing the hypothesis test in this manner allows the star tracker to determine the maximum probability that a coordinate or position on the image satisfies a hypothesis, for example whether or not there is a star in that position in a fast and efficient manner. By testing the hypotheses and computing the likelihood metric, it is possible to obtain the position of centroid candidates to be evaluated as being similar to the shape of a star, i.e. pixels that may be stars, even in images having low SNR or containing stars with low intensity values.

In some instances, it is possible to perform these operations pixel by pixel on the image, although it is also possible to perform these operations by groups of pixels. With the intention of testing the hypotheses on the image pixel by pixel or by groups of pixels, embodiments may further include determining a window comprising one or more pixels. The window may be moved or slid over the image, generally the size of one pixel at a time, in order to compute the statistical parameters in each pixel of the whole image or in pixels belonging to sub-regions of the whole image. For example, the window may be slid horizontally the size of one pixel, so that the window moves horizontally one column, and/or may be slid vertically the size of one pixel, so that the window moves vertically one row. For the pixels of each window, the hypotheses may be set in order to compute the statistical parameters. For instance, it may be assumed that for a hypothesis $H_0$ that there is no star, modeled as noise, the Gaussian distributions of the pixels of the window would have the same statistical parameters i.e. the Gaussian distributions of the window would have the same mean value ($\mu_0$) and standard deviation ($\sigma_0$). It may be also assumed that for a hypothesis $H_1$ there is a star, modeled as a Gaussian bell representing the expected shape of a star blob with the peak located in the center of the window having the statistical parameters amplitude ($\alpha$), mean value ($\mu_1$) and standard deviation ($\sigma_1$), the Gaussian bell would be mounted on top of the Gaussian distribution having the effect of shifting the mean value differently for each pixel of the window. Based on the intensity level of the pixels within the window, the statistical parameters ($\mu_0$, $\sigma_0$, $\alpha$, $\mu_1$, $\sigma_1$) may be estimated. The estimated statistical parameters $\mu_0$ and $\sigma_0$ may be obtained by maximizing the probability of $H_0$, and the statistical parameters $\alpha$, $\mu_1$ and $\sigma_1$ may be obtained by maximizing the probability of $H_1$. Hence, for each window, a hypothesis is tested, for example whether there is a star or not, the statistical parameters of two different hypothesis models is estimated, and it is determined which one fits the data of the window better. So, for each window, the statistical parameters $\mu_0$, $\sigma_0$, $\alpha$, $\mu_1$, $\sigma_1$ that maximize the probability of both hypothesis are chosen to compute the likelihood metric, and the likelihood metric may be the quotient between the two likelihoods of the hypotheses. By determining whether the value of the likelihood metric is above or below a threshold value it is possible to determine whether or not there is a star in the center of the window. It is useful to estimate the statistical parameters for each pixel on the image by sliding the window the size of one pixel over the whole image. However, in some implementations, for example when the calculations have been already resolved and one or more centroid candidates have been detected or when it is possible to obtain a hint, the star tracker may use that information in order to reduce the areas of the image to be searched, so that instead of searching the whole image, that is, instead of estimating the statistical parameters on each pixel of the whole image sliding the window generally one column and/or one row at a time, it is possible to search preselected sub-regions of the image by estimating the statistical parameters on each pixel of the sub-region sliding the window (generally one column and/or one row at a time) over the sub-region instead of the whole image, with the advantage of reducing the computation time.

By operating in this manner the impact of noise on attitude estimation using images with low SNR is highly reduced, thereby eliminating the need for costly, bulky or weighty star tracker systems that require high resolution cameras which generally weigh more than 20-40 kg. Noise is usually not constant over the whole image and in some instances it may not be within the same order of magnitude, for this reason, determining the likelihood metric as a relationship between statistical values such as the likelihoods of occurrence of the hypotheses reduces the influence of the non uniformity distribution of noise over the image. This may be achieved because the statistical parameters of the hypotheses may be estimated for each pixel or each window independently, so that if the noise in one window is different from the noise in another window, this may be reflected in the computed likelihoods because the distribution modeling the noise may have different statistical parameters for each pixel or window.

Embodiments further include matching the centroid candidate(s) previously determined on the images to astronomical objects. The centroid candidates may be identified based on databases or catalogs containing information including the position and/or identity of astronomical objects, usually expressed in an inertial reference frame. The astronomical objects identified on the images may include natural or artificial astronomical objects or bodies such as stars, planets, or satellites. Typically, the listed astronomical objects are grouped together because they share a common type, morphology, origin, means of detection, or method of discovery. In some instances, the artificial astronomical objects may be listed because their trajectory may be known or calculated (e.g. artificial orbiting satellites). Based on the matched astronomical objects, embodiments further include determining the attitude of the spacecraft or satellite-based imaging system.

Some main disadvantages of conventional star tracker systems include the necessity of consulting star catalogs numerous times, which results in increasing computing resources not suitable for platforms with limited resources, such as satellites. Embodiments further include estimating the position of the previously identified astronomical objects such as stars, based at least in part upon analyzing two or more images, typically subsequent images or sometimes consecutive images.

Example of Imaging System for Attitude Determination

Figure 2:
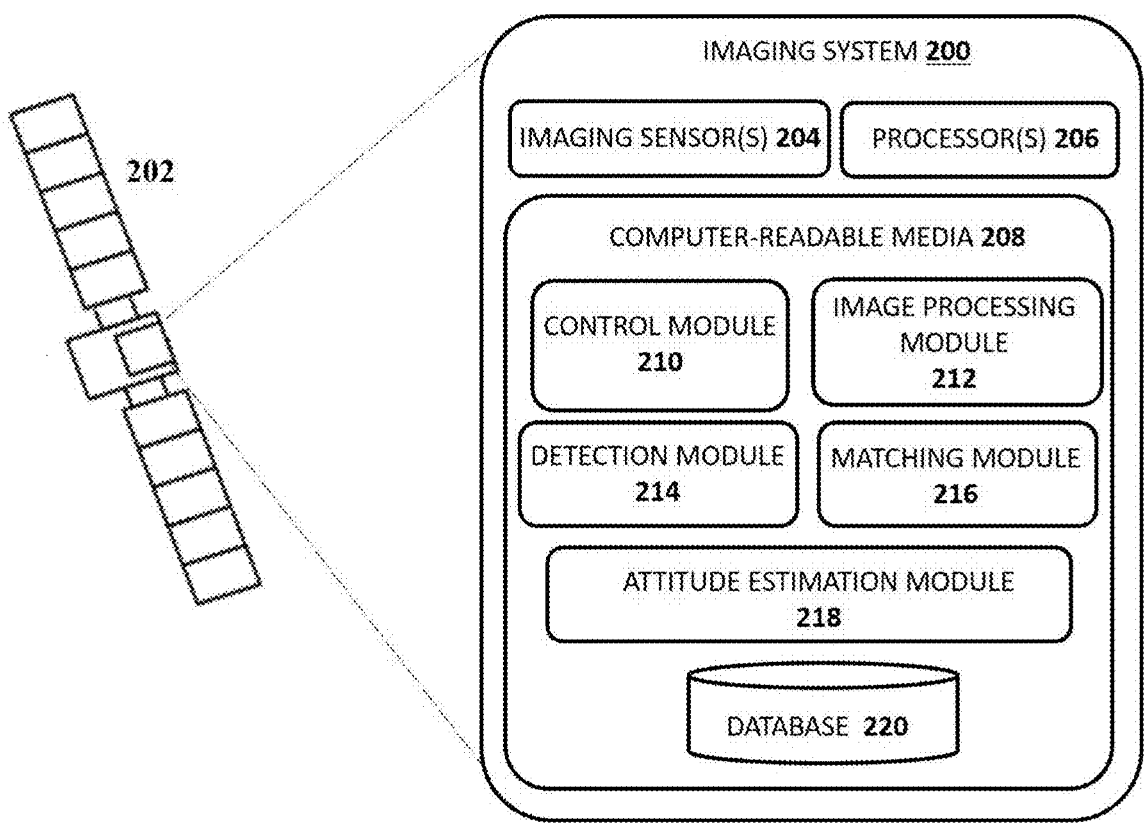
FIG. 2 a block diagram of an example imaging system for attitude determination on-board a movable platform, according to embodiments of present disclosure.

According to some embodiments, the imaging system described herein may be part of a stationary platform, such as a ground-based station, or may be part of a movable platform, namely a manned or unmanned spatial, aerial, maritime or terrestrial vehicle such as a ship, a watercraft, an aircraft, a spacecraft, a balloon, a satellite, or any other platform to which the imaging system for attitude determination may be mounted. FIG. 2 is a block diagram of an imaging system 200 for attitude determination on-board a movable platform, such as a satellite 202 in a Low Earth orbit (LEO), Medium Earth Orbit (MEO) or Geostationary Orbit (GEO) in accordance with embodiments of the present disclosure. The imaging system 200 may comprise one or more imaging sensors 204, one or more processors 206, and computer-readable media 208. The imaging system 200 is configured as any suitable computing device or system. The imaging sensor(s) 204 may include a plurality of pixel sensors, such as light-absorbing diodes. The imaging sensor (s) 204 may be of various types, such as for example a charge coupled device (CCD), complementary metal oxide semiconductor (CMOS) sensor, or other suitable architecture. The processor(s) 206 are central processing units (CPU), graphics processing units (GPU) or both CPU and GPU, or any other sort of processing unit, such as, for example, digital signal processors (DSPs), tensor processing units (TPUs), field programmable gate arrays (FPGAs), application-specific integrated circuits (ASICs), or others, such as, artificial intelligence and machine learning accelerators. Optionally, the processor(s) 206 may be separated from the imaging sensor(s) 204, located at a distance, or integrated with the imaging sensor(s) 204. Other examples of processors or components may be used with embodiments described herein and are contemplated herein as providing the features and benefits described. The one or more processors 206 are processors dedicated to the imaging system 200, but in many instances may be the same processor that controls the satellite 202.

The computer-readable media 208 is non-transitory and may store various instructions, routines, operations, and modules (collectively referred to as "programs"), that are loadable and executable on the one or more processors 206, as well as data generated during execution of, and/or usable in conjunction with, these programs, such as image data, images, and so forth. The computer-readable media 208 may include volatile and nonvolatile, removable and non-removable tangible, physical media implemented in any process or technology for storage of information, such as computer-readable instructions, data structures, program modules, or other data. System memory, removable storage, and non-removable storage are all examples of computer-readable media 208. The computer-readable media 208 may include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory (such as NAND flash memory such as may be included in one or more nonvolatile memory cards, and including flash with both single-level and multi-level cell technologies) or other memory technology, compact disk read-only memory (CDROM), digital versatile disks (DVD) or other optical storage, magnetic cassettes, magnetic tape, magnetic disk storage or other magnetic storage devices, or any other tangible, physical medium which can be used to store information and which can be accessed by a computing device.

In some instances, the imaging system 200 may further comprise one or more baffles (not shown) primarily used to filter out stray light in order to reduce or minimize the stray light level directed towards the imaging sensor(s) 204 and lenses (not shown) placed on the optical path of the imaging sensor(s) 204. In some implementations, a plurality of imaging systems placed at different directions on board the satellite and directed at different regions of the sky may be used. As used herein, the term "a plurality" refers to more than one countable entity. Generally, the system memory, the processors and/or the modules stored in the system memory may be shared between the plurality imaging systems. In some instances, a single imaging system may have a plurality of imaging sensors. Other combinations in the number of imaging systems or its components may be used with embodiments described herein.

The computer-readable media 208 may store one or more modules for controlling the imaging system 200 and other systems and hardware on board the satellite 202 such as interfaces, payloads or sensors, as well as other satellite-based tasks, and for processing and analyzing the images. The computer-readable media 208 may include at least a control module 210, an image processing module 212, a detection module 214, a matching module 216, and an attitude estimation module 218. In some embodiments, some or all of the functions of the modules may be implemented as logic functions on the processor(s) 206. It should be appreciated that not all of the modules need be present in every embodiment, that additional modules may be present for other purposes, and that several modules may be present for one or many of the purposes described. The computer-readable media 208 may further store one or more databases 220 such as astronomical catalogs listing stars.

The control module 210 may perform some or all of the control functions associated with capturing and processing images in accordance with embodiments of the present disclosure. The control module 210 is executable by the processor(s) 206 to control, such as through one or more input/output interfaces, the imaging sensor(s) 204. The control module 210 is primarily responsible for sending instructions to the hardware components of the imaging system 200 for capturing image data. The control module 210 may further include instructions for collecting, storing, cataloging, timestamping collected images, determining exposure, amplification gains, and image statistics, among other things.

The image processing module 212 may perform various image processing functions of the imaging system 200, including normalization of the intensity, filtering, clustering, centroiding, smoothing, color enhancement, and/or processing to enhance resolution or other attributes of the image data, as well as other processing functions, such as blur removal, distortion correction, artifact removal, cropping, image conversion, image compression, data encryption, and so forth. The image processing module 212 may include instructions for pre-processing and processing the images in order to reduce any image noise present in the frames. As used herein, the term noise is a broad term that refers to data that is not meaningful in itself and makes the useful data less clear. The most relevant type of noise in present disclosure is the image noise which makes image data less clear such as background noise present on the image. In some instances, the image noise may include noise introduced by the imaging sensor such as hot pixels (i.e. defective pixels), dark current, fixed-pattern noise, and so forth. For example, the satellite may capture images with the imaging sensor in complete darkness in order to obtain a dark frame or an average of dark frames and may apply dark-frame subtraction techniques to reduce the background noise introduced by the imaging sensor. The image processing module 212 may implement any type of programs or algorithms for processing images including suitable programs for removing hot pixels, smoothing the Photo Response Non Uniformity (PRNU), and so forth.

The detection module 214 is primarily responsible for detecting centroid candidates by filtering the images or frames which were generally previously pre-processed by the image processing module 212 to reduce the image background noise. After detecting the centroid candidates on the pre-processed images, the detection module 214 may provide the position (e.g. (x,y) coordinates) of the detected centroid candidates to the matching module 216. The detection module 214 may detect the centroid candidates based at least in part on a statistical-based technique comprising a hypothesis test. A typical hypothesis test assesses the plausibility of a hypothesis using sample data (e.g. star tracker data). Generally, the purpose of the test is to provide evidence on the plausibility of a null hypothesis and an alternative hypothesis. Both hypotheses are mutually exclusive and only one can be true. In some instances, it is possible to test more than two hypotheses provided that all of them are mutually exclusive. Typically, the detection module 214 detects centroid candidates as explained in the processes described in FIG. 3 to 8.

The matching module 216 is primarily responsible for matching some or all of the centroid candidates detected by the detection module 214 to stars. The matching module 216 may use information provided by the database 220 containing star identification information which may include position information of the stars in star coordinates (i.e. with respect to an inertial frame of reference). Generally, the satellite may identify stars using stellar maps, charts or catalogs, but it may also identify other objects using astronomical object catalogs that list artificial or natural astronomical objects such as planets or satellites. The matching module 216 may use several techniques and algorithms to identify stars including techniques based on the relative intensity of the centroid candidates, the patterns formed by the centroid candidates, the relative position between the centroid candidates, or any other property or parameter associated with the centroid candidates. Once the stars have been identified, the matching module 216 may determine the coordinates of the star vectors in the inertial frame of reference for the centroid candidates that matched the stars on the database 220. Based on the star vectors, the matching module 216 may generate a mapping between the coordinates of the stars on the database 220 and the coordinates of the centroid candidates on the image.

The attitude estimation module 218 is primarily responsible for estimating the attitude of the satellite based on the mapping of coordinates. The attitude estimation module 218 may employ algorithms to determine the rotation matrices that relate the orientation of the satellite with respect to star vectors in the inertial frame of reference, representing mappings between the inertial frame of reference (i.e. star vectors) and the body frame of reference (i.e. the imaging system 200 and/or the centroid of the satellite 202).

Example Operations for Attitude Determination

FIGS. 3 to 8 depict flow graphs that show example processes in accordance with various embodiments. The operations of these processes are illustrated in individual blocks and summarized with reference to those blocks. These processes are illustrated as logical flow graphs, each operation of which may represent a set of operations that can be implemented in hardware, software, or a combination thereof. In the context of software, the operations represent computer-executable instructions stored on one or more computer storage media (also referred to as "computer-readable media") that, when executed by one or more processors, enable the one or more processors to perform the recited operations. Generally, computer-executable instructions include routines, programs, objects, modules, components, data structures, and the like that perform particular functions or implement particular abstract data types. In the context of hardware, the operations may be carried out in an integrated circuit, such as in ASIC, a programmable logic device (PLD), such as a FPGA, a GPU, a CPU, or a TPU. Other examples of hardware may be used with the embodiments described herein and are contemplated herein as providing the features and benefits described. The order in which the operations are described is not intended to be construed as a limitation, and any number of the described operations can be combined in any order, separated into sub-operations, and/or performed in parallel to implement the process. Processes according to various embodiments of the present disclosure may include only some or all of the operations depicted in the logical flow graph. Moreover, the operations may be carried out by a single system, such as onboard stationary or movable platforms, or may be shared between multiple systems located onboard one or more vehicles or ground based systems.

FIG. 3 is a flow diagram showing some steps (on a high level) of an example process 300 for spacecraft attitude determination using star tracker data, according to embodiments of present disclosure. At 302, one or more images may be captured. The control module 210 of the star tracker (a type of spacecraft-based imaging system) may direct an imaging sensor to capture one or more images, the star tracker comprising a camera having one or more optical imaging sensors. The star tracker may capture or acquire several images using more than one camera. In some instances, the steps of the process may run separately in separate processors associated with each camera, whereas in other instances the steps may be performed in a single processor receiving the images from a plurality of cameras.

At 304, the captured images may be processed to remove or reduce the noise present on the images. Several algorithms may be performed for image processing, including instructions for checking the intensity level of pixels comprising the image data, removing hot pixels, smoothing PRNU, and so forth.

At 306, one or more centroid candidates may be detected on the processed images. A partial image and not a full-sized image may be used at this stage, although a full-sized image may also be used. A detection module 214 executed by a processor of the star tracker (although in some instances it may be the same processor as the general processor of the spacecraft) may detect the centroid candidates as described in more detail elsewhere within this Detailed Description. Each of the detected centroid candidates has a determined position on the image and may be represented by a XY pair or XY coordinate, depicting respectively a horizontal and vertical position on the image. The XY coordinate may be also related to the imaging sensor so that the XY coordinates are respectively the horizontal and vertical addresses of any pixel or addressable point on the imaging sensor.

At 308, the one or more detected centroid candidates may be matched to stars. A matching module 216 may determine which detected centroid candidates are stars, using a star catalog or database. Several algorithms considering local characteristics of the stars may be employed to identify stars or constellations by comparing the centroid candidates with known star patterns, such as techniques based on the angular distances between two closest neighboring stars, information about the area A of a triangle comprising a number of stars, three planar angles of the triangle, or any other pattern matching technique useful to match centroid candidates with a star or a constellation. Once one or more stars are matched to one or more detected centroid candidates, the matching module may determine a one-to-one map between the XY coordinates of the stars in the inertial frame of reference and the XY coordinates of the detected centroid candidates in the body frame of reference.

At 310, a transformation factor is obtained, based on the detected centroid candidates that matched stars. The transformation factor may comprise any relation representing the mapping between coordinates in an inertial frame of reference and coordinates in a body frame of reference. The transformation factor may comprise a rotation matrix that allows to compute the orientation of the spacecraft with respect to the stars' inertial frame of reference. The transformation factor may be computed based on the camera model, location and type of cameras or imaging sensors, or any other consideration relevant for this calculation. An attitude estimation module may use the information derived from the above process to estimate the attitude $q_{B/N}$ of the spacecraft.

FIG. 4 is a flow diagram showing some steps (on a high level) of an example process 400 for detecting one or more centroid candidates, according to embodiments of present disclosure. At 402, an image is filtered to obtain candidate pixels, that is, pixels which are centroid candidates. Generally, the image has been previously pre-processed to remove background noise introduced by the camera that acquired the image. The image may be filtered using statistical-based techniques, such as a hypothesis test, based at least in part on a likelihood metric as explained in more detail in the flow diagram of FIG. 5. By filtering the image, the detection module may select the pixels that qualify as centroid candidates (i.e. candidate pixels) and may obtain the XY coordinates of the candidate pixels.

At 404, optionally the candidate pixels may be grouped to obtain one or more pixel clusters. After obtaining the XY coordinates of the candidate pixels, the detection module may recognize which candidate pixels are neighboring candidate pixels and form pixel clusters with them. For example, the detection module 214 may determine a threshold distance so that any candidate pixel whose XY coordinate is equal to or lower than the threshold distance from the XY coordinate of another candidate pixel is considered as a neighboring candidate pixel. The detection module may group the candidate pixels that are within the threshold distance to form a cluster. By clustering the neighboring candidate pixels, the detection module may obtain one or more sets of XY coordinates corresponding to the pixels forming the one or more clusters.

At 406, a cluster centroid may be determined for some or all of the one or more clusters to obtain centroid candidates. Several algorithms may be used to determine the cluster centroid for some or all of the one or more clusters in order to obtain the XY coordinates of each cluster centroid and set the XY coordinates of the cluster centroid as a centroid candidate. The position of the centroid candidates may be subsequently used by the matching module to identify one or more stars and match them to the centroid candidates, generally using a star catalog, or other astronomical objects. By operating in this manner, it is possible to increase the accuracy of the positions determined for the centroid candidates so that a more efficient, more fine tuned and more accurate matching may be performed by the matching module.

In some instances, the detection module 214 may form a filtered frame or image based on the pixels selected using a hypothesis test, on the statistical distributions and functions modeling the hypotheses, and/or predetermined conditions. For example, the detection module may determine a level of intensity for each pixel of the frame by estimating, based at least in part on the modeled hypotheses (e.g. there is a star and there is no star), the statistical parameters that have generated the observed data. The statistical parameters may be estimated by determining the statistical parameters that maximize the likelihood of the hypotheses, e.g. the likelihood of the hypothesis that in a pixel there is a star and the likelihood of the hypothesis that in the same pixel there is no star. Based on the estimated statistical parameters, the likelihoods of the hypotheses are calculated and a likelihood ratio between both likelihoods may be computed. The level of intensity for the pixel may be determined based on whether the likelihood ratio satisfies a predetermined threshold value. By determining in this manner the level of intensity for the pixels of the frame, the detection module may form the filtered frame.

Figure 5:
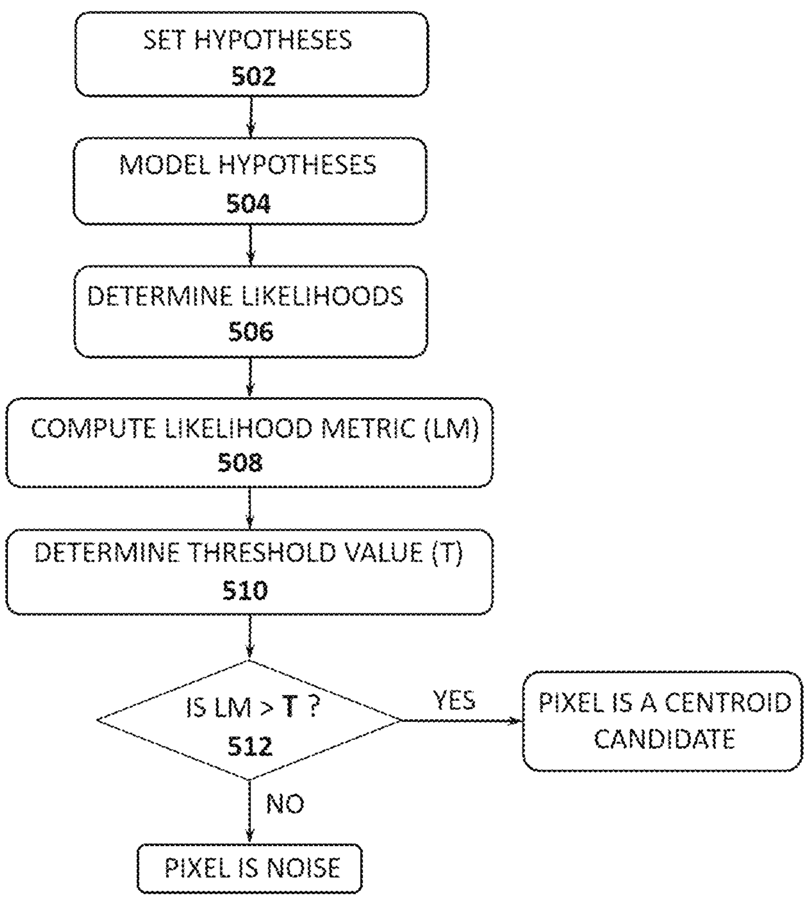
FIG. 5 is a flow diagram showing some steps of an example process for filtering frames using a hypothesis test to detect centroid candidates, according to embodiments of present disclosure.

FIG. 5 is a flow diagram showing some steps (on a high level) of an example process 500 for filtering frames using a hypothesis test to detect centroid candidates, based at least in part on a likelihood metric. At 502, a null hypothesis and one or more alternative hypotheses may be set. Any type of hypotheses may be set, such as one-sided or two-sided hypotheses, provided that the hypotheses are mutually exclusive i.e. only one can be true. For example, a null hypothesis $H_0$ may be set as "there is no star", and an alternative hypothesis $H_1$ may be set as "there is a star". It should be appreciated that apart from hypotheses based on the shape of stars, other hypotheses may be modeled, for example, hypotheses based on star quantities, on star magnitudes, and so forth. For example, different star magnitudes may have different hypotheses like $H_0$: "there is no star", $H_1$: "there are stars of magnitude 1 or 0, $H_2$: "there are stars of magnitude less than 0" and so forth.

At 504, the hypotheses may be modeled. For example, the null hypothesis $H_0$ may be modeled as noise (also referred to as "image noise"), since if the hypothesis is that there is no star, then only noise introduced by the imaging system would be present. The noise may be modeled with a statistical distribution comprising a Gaussian distribution representing random noise. Additionally or alternatively, it is possible to model the noise as photon noise using a Poisson distribution, given that frequently the main noise found in raw images is photon noise, or it is possible to model the noise as stray light. In some instances, the noise may be modeled as a combination of a stray light noise model and a photon noise model, which may be used as a baseline. The alternative hypothesis $H_1$ may be modeled as a star pattern, such as a star blob, and in some instances the modeling may include the noise that may be present in the pixel. For example, the star pattern may be modeled as any function or waveform representing the assumed shape of the star such as a Gaussian bell, a saturated Gaussian bell, a sinc function, a square waveform, a rectangular waveform, a sawtooth waveform, a triangle waveform, any combination of these, and so forth, that is, any suitable function which can approximate the assumed shape of the star; and the noise may be modeled similarly as the noise of the null hypothesis (e.g. a Gaussian or normal distribution). In some instances, if $H_0$ is modeled as noise, $H_1$ will include the same model of noise as the one modeled in $H_0$.

Figure 6:
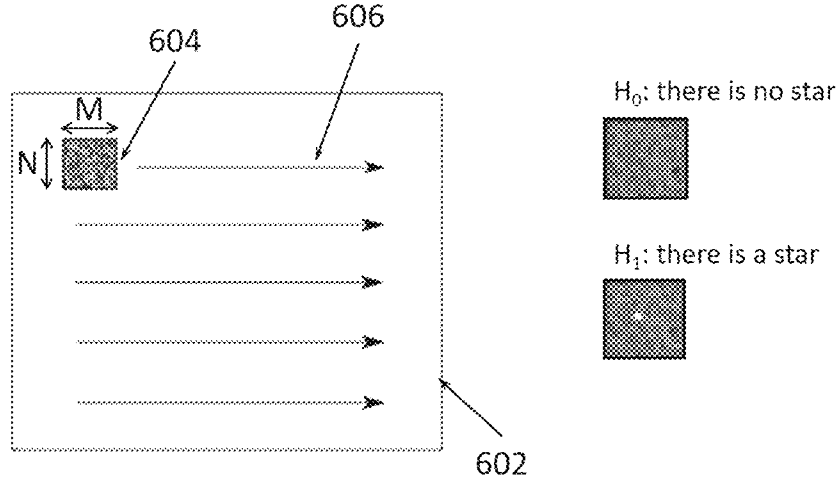
FIG. 6 illustrates an example of a window and hypotheses for detecting centroid candidates, according to embodiments of present disclosure.

FIG. 6 shows an example of hypothesis $H_0$: "there is no star", $I(x,y)=n(x,y)$, and hypothesis $H_1$: "there is a star", $I(x,y)=\alpha g(c,s)+n(x,y)$. The main advantage of modeling the noise as a statistical distribution is that it may be used to impact each pixel of the image independently. It should be appreciated that other functions or distributions for modeling the hypotheses will be recognized by those of ordinary skill.

At 506, a likelihood of occurrence of the hypotheses is determined. The likelihood of occurrence of the hypotheses may be computed for all the pixels of the frame (whole frame) or for pre-selected pixels of the frames (sub-regions). Additionally or alternatively, the likelihood of occurrence of the hypothesis in a pixel may be computed evaluating the pixel or a window comprising the pixel. A window as used herein refers to a group or set of pixels as described in more detail elsewhere within this Detailed Description. It should be understood that the terms "likelihood" and "probability", as used herein, shall be used in a broad sense, and its calculation may encompass any algorithm in which statistics are computed based on the models designed for the hypotheses. A skilled person would understand that the term probability is used to find the chance of occurrence of a particular situation, whereas the term likelihood is generally used to maximize the chances of a particular situation to occur. So, the term likelihood of occurrence of a hypothesis refers to the probability of the statistical parameters of the function and/or distribution chosen to model the hypothesis given the observed data (e.g. pixel intensity levels of the captured image). Hence, the estimated statistical parameters would be the plausible choice given the observed data. In other words, if the statistical parameters of a statistical distribution are fixed and the random variable is variable, then a probability is computed, whereas if the statistical parameters of a statistical distribution are variable and the random variable is fixed, then a likelihood is computed. The statistical parameters that maximize the likelihood for each hypothesis are calculated/estimated. Then, the likelihood for each hypothesis is obtained using the statistical parameters, and the highest likelihood among the obtained likelihoods, calculated with the estimated statistical parameters, may be selected for further use, as explained throughout the Detailed Description. In some instances, it is possible to detect centroid candidates using the computed likelihood of occurrence of the hypotheses $H_0$ and $H_1$. However, for poor quality images which have low SNR ratio, usually captured by low cost cameras, detecting centroids only determining the likelihoods is a technique sensitive to the different distributions of the random intensity values along the images. In contrast, given that the noise may not be constant or of the same order of magnitude over the whole image, the detection module may detect centroid candidates based on a likelihood metric which may be computed independently for different pixels, windows, or regions of the image, thereby allowing to adapt to the different noise present in different regions of the image.

At 508, a likelihood metric is computed. The likelihood metric may refer to a value weighting or relating the likelihood of occurrences. In some instances, the likelihood metric may be computed as relationships between the estimated likelihoods of the hypotheses. For example, after computing the likelihood of occurrence of $H_0$ as the probability of the intensity of a pixel to be noise given the intensity of the pixel $L(I)=P(H_0)$, and the likelihood of occurrence of $H_1$ as probability of the intensity of the same pixel to be a star given the intensity of the pixel $L(I)=P(H_1)$, the likelihood metric may be computed as the quotient of the likelihood of $H_1$ to be true divided the likelihood of $H_0$ to be true $$\left(\frac{L(I)=P(H_1)}{L(I)=P(H_0)}\right).$$

By using the ratio of likelihoods when the likelihood metric is computed as the quotient of the likelihoods, there may be a sort of normalization that makes it possible to compare for the same region two likelihoods for the two hypotheses, solving the problem of having variable noise throughout the whole image.

After computing the likelihoods of occurrence of the hypotheses and the likelihood metrics, it is possible to preliminary identify the centroid candidates. However, if the detection module 214 proposes too many centroid candidates to the matching module, it may make it harder for the matching module 216 to find the matches between the centroid candidates and the stars on the catalog, and there may be a penalty on computational speed, time, and even precision, because if there are too many proposed centroid candidates the matching module may introduce errors. Consequently, it is important to minimize the false positives (i.e. centroid candidates that are not stars), so as to provide to the matching module the minimum necessary centroid candidates. A way of minimizing the false positives may be to detect centroid candidates by determining whether the likelihood metric satisfies a predetermined condition. The predetermined condition may comprise a predetermined threshold value.

At 510, a threshold value may be determined. The threshold value may be a fixed value to be used in all the windows or pixels in the image, or may be a variable value that may be different for different pixels or windows in the image. In some instances, the fixed value may be calculated as a multiple of the standard noise value of some or all of the pixels on the image, as a statistical noise estimate, or as a local noise estimate determined on the fly. A threshold value that remains constant for the computation of the statistical values for each of the windows over the image and/or sub-regions of the image may reduce the computational time and resources, allowing simple and fast calculations. In some instances, the threshold value may be determined based on the amplitude of the noise present on the image. It is also possible to determine the threshold value by deriving a mathematical expression taking into account a predetermined level of desired sensitivity in the measurement of the probabilities. It is also possible to determine the threshold value using the Bayesian interpretation. Under this interpretation, instead of setting the likelihood metric as a quotient between the two probabilities, the likelihood metric is set as a quotient between two a priori probabilities. For example, the a priori probabilities may be computed as the probability of the detected pixel intensity level, given the hypothesis $H_1$ or $H_0$, so that the quotient is between the probability $H_0$ being true over the probability of $H_1$ being true. The threshold value may be adjusted or tuned with a priori information by determining the probabilities of the hypotheses a priori, such that if a star was detected in a previous frame, its position could be predicted in a posterior frame and that information may be used to tune the threshold value.

In some instances it is possible to combine the methods to determine the threshold value. For example, firstly a threshold value may be determined using a priori probabilities in order to determine the positions on the image in which to look for centroid candidates, and after obtaining the more plausible locations where the centroid candidates may be situated, a fixed threshold value may be set so that a constant threshold value may be used for subsequently locating the centroid candidates over the whole image. As explained above, the possibility of using a constant threshold value is useful and advantageous to reduce complexity and computational time. This is feasible because the parameters of the probabilities may be estimated for each window while it slides over the image adapting to any kind of noise that may be present on the image, and because the threshold value may be used for evaluating a likelihood metric representing a quotient between probabilities as a form of normalizing the data.

At 512, the threshold value may be used to detect centroid candidates. The detection module may detect centroid candidates by determining whether the likelihood metric is above, equal or below the threshold value. For example, if the likelihood metric is above a predetermined threshold value in a way that the quotient $$\frac{L(I)=P(H_1)}{L(I)=P(H_0)}$$

is above T, it may indicate that for the pixel being evaluated the probability of being a star is higher than the probability of being noise. Hence, the detection module may determine that a pixel is a centroid candidate if the likelihood metric is above the predetermined threshold value.

By operating in this manner, it is also possible to enhance the filtering process by feeding back information to the image processing module 212. For example, new hot pixels that appear repeatedly along many frames and were not matched by the matching module may be identified, hence the detection module 214 may send this information to the image processing module which may consider these pixels as hot pixels and may use them in the pre-processing step of the images in order to remove background noise. Another way of enhancing the filtering process is to include another filter before the matching module 216 (for example in the processing module or the detection module) which may detect candidates of satellites in the image, either using a satellite database or by determining the position of satellite whose trajectory may be known or calculated, so that these pixels do not reach the matching module as centroid candidates, or the matching module may receive information about the identity and position of these pixels sent as centroid candidates and may assign to them lower probabilities of being a star.

In some instances, the likelihood of occurrence of the hypotheses and/or the likelihood metric in a pixel may be determined taking into account the information of its surrounding pixels by setting a window comprising a preselected number of pixels surrounding the pixel. FIG. 6 illustrates an example of a window and hypotheses for detecting centroid candidates, according to embodiments of present disclosure. For example, for the two dimensional image 602 comprising a plurality of pixels, the likelihood of occurrence and/or the likelihood metric may be computed in the window 604 comprising N×M pixels; where N and M are integer numbers from 1 to the number of pixels corresponding to the size of the image. In some implementations, N may be the same as M. The size and/or shape of the window is arbitrary and may comprise an arbitrary number of pixels. In some instances, the window may include a single pixel. For example, when the preselected window is a pixel and the hypotheses are tested pixel by pixel, even though a pixel may appear bright it could still be considered noise because it does not fit the star model which corresponds to the hypothesis that there is a star ($H_1$). Hence, a preselected window (or pixel if it has the size of a pixel) may have more noise, but still the hypothesis that there is no star ($H_0$) will be the more plausible hypothesis. The size of the window may be determined based on the astronomical object to be detected, on the model of the hypotheses, on the overall amount of noise to be integrated throughout the window, or any other relevant criteria that may consider the resolution and degree of noise, since if the window is too small it may be difficult to differentiate between objects and if it is too big it may catch more noise that what is desired to be able to detect the objects. By testing the hypothesis in preselected windows, it is possible to detect stars in spite of having low contrast images, in which the background of the captured images may not always be sufficiently dark with respect to the bright spots, usually due to light reflections introduced by spurious sources as those shown in FIG. 1.

In a non-limiting example, a star tracker may filter images by testing the hypotheses $H_0$ and $H_1$ to obtain the pixels that qualify as centroid candidates in the two dimensional image 602, using the window 604. The detection module 214 may compute the probabilities and the likelihood metric inside the window 604 of N×M pixels and may slide the window to a position horizontally or vertically offset from its original position in order compute the probabilities and the likelihood metric with the pixels of the window 604 that are in the offset position. In some implementations, the window 604 may be slid or shifted horizontally 606 from a first position to a second position by one pixel at a time, in a way that the relative displacement from the first to the second position is the size of a pixel, so that the pixels of the window 604 in the first position overlap by at least one pixel the pixels of the window 604 in the second position. Depending on the size of the window the relative displacement from the first to the second position may be the size of a pixel or a multiple thereof. It should be understood that the window 604 may be shifted following other directions apart from or in addition to horizontal displacements relative to the first position or a subsequent position of the window (e.g. windows may be slid vertically, windows may be slid both horizontally and vertically, and so forth). Generally, it may be assumed that the position of the star will be located in the middle or in the center of the window. However, the precise location within the image may become evident because the window may be slid one pixel at a time, hence by sliding with a step of one pixel it is possible to determine the specific location of the pixel having more probability of being a star. Furthermore, it may be possible to compute the statistical values, or to estimate the statistical parameters, through convolution operations, reducing possible computational burdens. In some instances, the window may be slid throughout the whole image, so that the likelihood of occurrence of the hypotheses and/or the likelihood metric may be computed for each pixel of the two dimensional image 602 to obtain centroid candidates in all the pixels of the two dimensional image 602. This process may be useful when a star tracker mounted on a spacecraft is disoriented, for example when the spacecraft has no previous knowledge about its attitude, such as a so-called Lost-in-Space scenario. In other implementations, the window may be slid throughout sub-regions of the whole image, as explained elsewhere in the Detailed Description.

Continuing with the same example of the hypotheses $H_0$: "there is no star" and $H_1$: "there is a star", the detection module 214 may compute the likelihood of occurrence ($L(I)=P(H_0)$) of $H_0$ in a pixel of a window by estimating the statistical parameters of the statistical distribution representing the noise in that pixel taking into account the pixels of the window. The likelihood of $H_0$ ($L(I)=P(H_0)$) in a pixel may represent the probability of observing the modeled noise in the window, and the estimated statistical parameters may comprise the mean value so and the standard deviation $\sigma_0$ (Eq. 1).

$$P(I|H_0) = \prod_{i,j\in Window} P_n(I_{ij}) = \prod_{i,j\in Window}\left(\frac{1}{\sqrt{2\pi\sigma^2}}e^{-\frac{(I_{ij}-\mu)^2}{2\sigma^2}}\right) \quad \text{Eq. 1}$$

The detection module may also compute the likelihood of occurrence ($L(I)=P(H_1)$) of $H_1$ by estimating the statistical parameters of the statistical distribution representing the noise and the star shape. The likelihood of occurrence ($L(I)=P(H_1)$) of $H_1$ in a pixel may represent the probability of observing the modeled noise and the modeled star, i.e shape (g), in the window, and the estimated statistical parameters may comprise the star's amplitude a, the noise mean value pi, and its standard deviation $\sigma_1$ (Eq. 2).

$$P(I|H_1) = \prod_{i,j\in Window} P_n(I_{ij}-\alpha g_{ij}) = \prod_{i,j\in Window}\left(\frac{1}{\sqrt{2\pi\sigma^2}}e^{-\frac{(I_{ij}-\alpha g_{ij}-\mu)^2}{2\sigma^2}}\right) \quad \text{Eq. 2}$$

In some instances, the statistical parameters may be estimated by computing the maximum likelihood estimator (Eq. 3), as the values that maximize the probability of each of the hypotheses, respectively.

$$(\hat{\mu}_0, \hat{\sigma}_0) = \text{argmax}(P(H_0|\mu, \sigma)) \quad \text{Eq. 3}$$

$$(\hat{\alpha}, \hat{\mu}_1, \hat{\sigma}_1) = \underset{\alpha,\mu,\sigma}{\text{argmax}}(P(H_1|\alpha, \mu, \sigma))$$

Typically, the amount and type of noise present in a pixel may vary from one pixel to another over the image, usually due to spurious sources of light which may change from one part of the image to another part of the same image. Hence, the advantage of the process described in the present disclosure is that, because the parameters may be estimated for each window, the filtering process may be adapted to the type of noise that may be found in said window, that is, in said part of the image. Another significant advantage is that, by operating in this manner, it is possible to perform all the calculations (i.e. estimate parameters, compute likelihood metrics, and so forth) over a fixed computational time.

With the calculated likelihoods that in many instances were dedicatedly estimated for each window, a likelihood metric relating both likelihoods may be computed. The likelihood metric may be computed as a quotient between the two likelihoods for the window after each displacement (Eq. 4), which may be perceived as the probability of obtaining that pixel intensity level given there is a star, over the probability of obtaining that pixel intensity level given the fact that there is no star.

A threshold value may be determined in order to select the pixels that may qualify as centroid candidates. For example, if the numerator is larger than the denominator so that the likelihood metric is higher than Threshold, the hypothesis test indicates that it is more plausible that the pixel is a star, otherwise there is no star.

$$\frac{P(I|H_1, \hat{\alpha}, \hat{\mu_1}, \hat{\sigma_1})}{P(I|H_0, \hat{\mu_0}, \hat{\sigma_0})} \underset{H_0}{\overset{H_1}{\gtrless}} \text{Threshold} \qquad \text{Eq. 4}$$

In some instances, by computing a ratio between both likelihoods $$\left(\frac{L(I) = P(H_1)}{L(I) = P(H_0)}\right)$$

a dimensionless number is obtained which can be seen as a level of brightness. Hence, after computing the likelihood metric (e.g. the ratio) for each pixel of the whole image, the detection module 214 may form an image wherein each pixel, instead of representing the original brightness value as captured by the imaging sensor, represents at each pixel the dimensionless number, providing a cleaner picture with centroid candidates, because substantial noise is filtered out and the bright spots that were difficult to see are perceived as brighter. This enhancement makes it possible to also compute subpixel centers of star candidates by a standard center of mass technique applied to the dimensionless likelihood ratios instead of the original brightness in the image.

Figure 7:
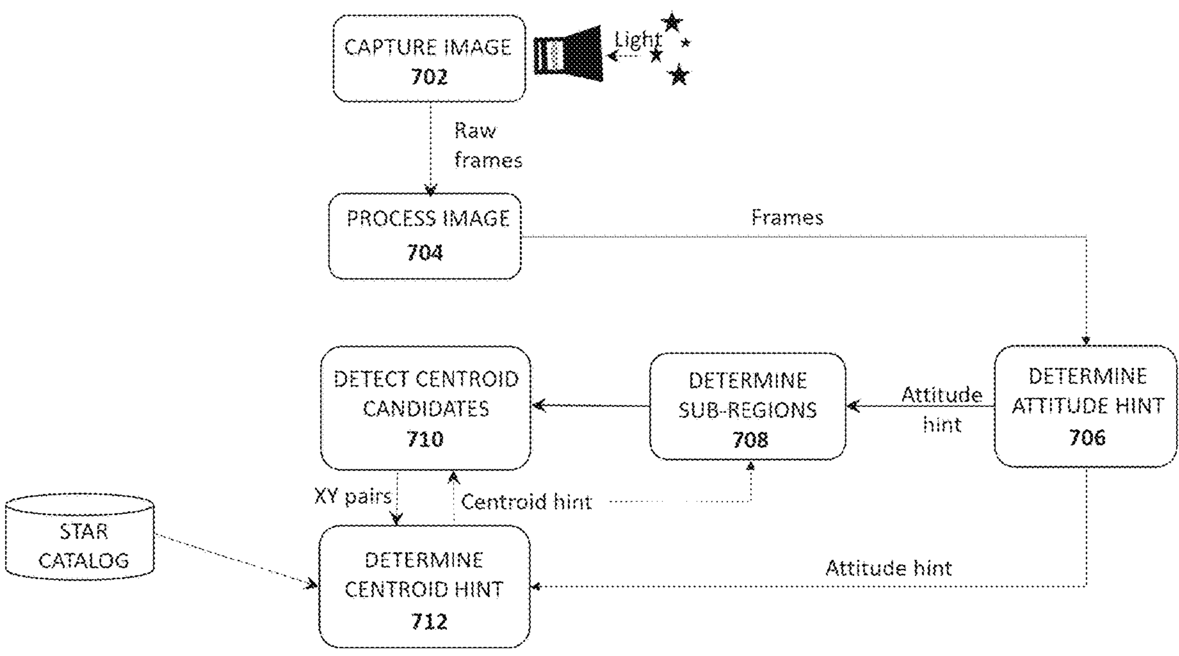
FIG. 7 is a flow diagram showing some steps of an example process for selecting sub-regions of an image to compute the hypothesis test, according to embodiments of present disclosure.

In other instances, it is possible to compute the likelihood of occurrence of the hypotheses and the likelihood metric to obtain centroid candidates in pixels of preselected sub-regions of the image instead of in each pixel of the image. FIG. 7 is a flow diagram showing some steps (on a high level) of an example process 700 for detecting centroid candidates in sub-regions of an image, according to embodiments of present disclosure. At 702, one or more raw images (frames) are captured. The control module 210 may direct the imaging sensors to capture one or more images. As in previous examples a partial image and not a full-sized image of the imaging system, may be used at this stage, although a full-sized image may also be used. In some instances, at least one first image and at least one second image are captured. At 704, the raw frames may be pre-processed to remove any background noise present on the frames as similarly explained in previous examples.

At 706, based on the one or more frames, an attitude hint may be estimated. The term hint as used herein refers to information useful for the determination of parameters, for example attitude hint refers to information useful for estimating the attitude of the vehicle, centroid hint refers to information useful for estimating the centroid candidates, and so forth. The hints may be obtained in numerous ways. For example, an attitude hint may be obtained from inertial sensors that may provide the angular velocity of the satellite, such as a gyroscope. In this example, by knowing the attitude of a first image, and using the inertial sensor information, the rotation speed of the vehicle can be obtained between the first image and a second image of which the attitude is to be estimated. Attitude hints may also be determined from images captured by imaging sensors. For example, an attitude hint may be obtained by estimating the optical flow of bright spots (e.g. centroid candidates), from a first image (of which an attitude is known) to one or more subsequently captured second images. This approach allows for a fast way of finding where the bright spots have been moved. Alternatively, the attitude hint may be obtained by estimating the angular velocity using at least two previous images as explained in FIG. 8. Alternatively, the attitude hint may be obtained by estimating the angular acceleration using at least three previous images.

At 708, one or more sub-regions of the image may be determined. In some instances, the detection module 214 may use the information from the centroid hints to determine one or more sub-regions. For example, by capturing subsequent frames, the centroid candidates move from a position in one frame to a new position in the subsequent frame, hence by using the known position of the centroid candidates in one frame and the attitude hint, it is possible to predict where the centroid candidates are going to be in the subsequent frame. Based on the predicted position, the detection module may select those parts of the image around those bright spots where the centroid candidates are supposed to be, to determine sub-regions. The detection module may then filter the image in the sub-regions using the process based on the hypothesis test as explained above, to search for centroid candidates and discard the remaining regions, speeding up the filtering process. The capability of setting sub-regions is also advantageous because it may reduce the number of false positives by avoiding searching for centroid candidates in regions of the image where it is possible to know a priori that the matching module 216 will not find stars. In some instances, the detection module may determine sub-regions so that each sub-region may be centered at each centroid hint, or may determine sub-regions so that a sub-region may comprise several centroid hints. The detection module may also determine the size of the sub-region as pixels within a predetermined range from the centroid hints.

At 710, one or more centroid candidates may be detected in the determined one or more sub-regions of the image. The detection module 214 may test the hypotheses $H_0$ and $H_1$, compute the likelihood metrics, and so forth, in each sub-region, either pixel by pixel or by using windows as previously described in previous examples. In some instances, the detection module may determine, based on the attitude hint and the size of the window, the iterations needed to slide the window over the sub-regions of the image to search for centroid candidates in all the pixels of the sub-regions, and optionally performing the computations using convolution operations to speed up even further the calculations.

At 712, one or more centroid hints may be determined. With the coordinates of the centroid candidates (xy pairs), the star catalog and the attitude hint, the matching module 216 may predict the position of the stars in the image based on the position of the stars in a previous frame to obtain one or more centroid hints. For example, the matching module may search for stars in the star catalog using centroid candidates determined for a first frame, and by predicting, based on the attitude hint, where the stars may be in subsequently captured second frames, the matching module may determine the centroid hints i.e. the probable position (xy coordinates) of the centroid candidates in the second frames subsequently captured after the first frame. This information may also be used for other modules to generate threshold values to test the hypotheses. The centroid hints may be useful for the matching module which may search for matchings in a portion of the star catalog having the stars predicted for the subsequent frame. The star catalogs typically have thousands of stars which may contain the position, magnitude and in some instances spectroscopic information of the stars. However, the field of view of the camera captures images containing a reduced number of stars compared to the number of stars of the whole catalog. Consequently, instead of scanning the whole star catalog looking for a match between the centroid candidates and the stars, by determining centroid hints it is possible to scan a smaller portion of the catalog to look for matches, consuming less time and computational resources. In some instances, the matching module may also predict new stars that may appear in the field of view of the camera due to the predicted position of the stars and may use that information to optimize the matching process. Hence, the matching module may re-project the stars of the catalog into the field of view of the camera, so that it may look for matchings for the stars that were predicted to be within the field of view of the camera. In some instances, the matching module may determine a section or portion of the star catalog to be searched for stars based on the field-of-view of the camera and the centroid hints and/or the attitude hint, so that the portion is determined as a multiple of the field-of-view of the camera including the centroid hints.

Figure 8:
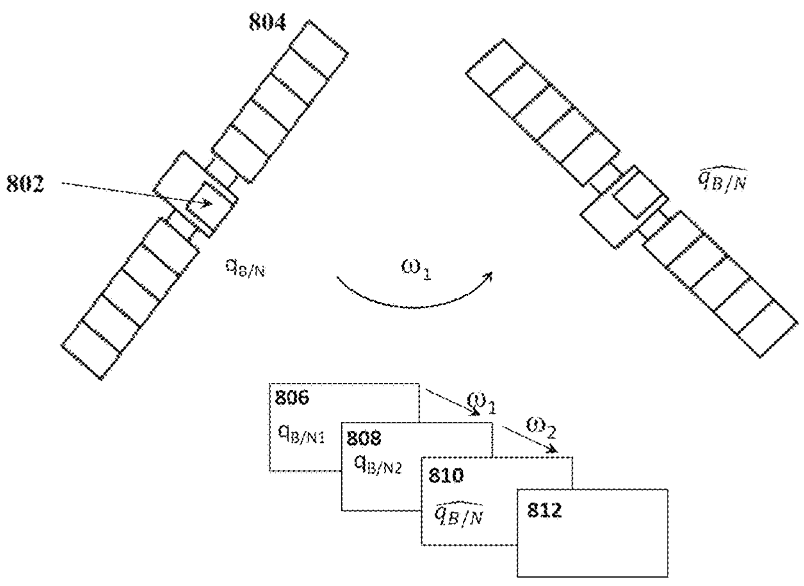
FIG. 8 is a block diagram illustrating an example process for determining attitude hints based on estimation of angular velocities, in accordance with embodiments of the present disclosure.

FIG. 8 is a block diagram illustrating an example process 800 for determining attitude hints based on estimation of angular velocities, in accordance with embodiments of the present disclosure. The star tracker 802 on board the satellite 804 may capture one or more subsequent frames. With information of frame 806, the star tracker 802 may estimate an attitude $q_{B/N1}$ associated with frame 806. The attitude may be estimated using several processes, including processes based on hypothesis tests explained in more detail throughout the Detailed Description. After capturing a subsequent frame 808, the star tracker 802 may estimate, based on the information of the frame 806, of which the attitude and the moment of capture is known, and the frame 808, of which the attitude and the moment of capture is also known, the angular velocity $\omega_1$ of the satellite 804 when capturing the frame 808. When the star tracker 802 captures a subsequent frame 810, the star tracker 802 may estimate the attitude $\widehat{q_{B/N}}$ of the satellite 804 when it captures frame 810, based on the estimated angular velocity $\omega_1$. In other words, if the satellite 804 moved with an angular velocity $\omega_1$ when it captured frame 808, it may be assumed that the satellite kept moving with the same angular velocity $\omega_1$ when it captured frame 810. This approach may be used when it can be assumed that the angular velocity is kept approximately constant, with no or little acceleration. This may happen for example when the images are captured with a small time between each other, and/or when the satellite does not change attitude fast. That is, from the attitude $q_{B/N1}$ the satellite 804 had in frame 806 and from the attitude $\widehat{q_{B/N}}$ the satellite 804 had in frame 808, the satellite 804 is going to have the estimated attitude $\widehat{q_{B/N}}$ when it captures frame 810. The angular velocity $\omega_1$ may thus be used to obtain an attitude hint. In an alternative approach, if it is not assumed that the angular velocity is kept constant between frames, the attitude can be determined based on the acceleration instead of based on the angular velocity. In this approach, to obtain subsequent attitude hints, the angular velocity of the closest previous frames has to be determined. For example, for estimating the attitude of frame 812, when not assuming that the angular velocity is kept constant, the angular velocity $\omega_2$ that the satellite 804 had when capturing frame 810 needs to be estimated. In this manner, and as explained elsewhere in the Detailed Description, it is possible to enhance the matching process by using the estimated attitude $\widehat{q_{B/N}}$, so that the matching module 216 may access the star catalog and may project, over the imaging sensor, the position of the stars where they may be found according to the estimated attitude. By operating in this manner, the matching module may search for matching between stars and centroid candidates in the projected regions of the star catalog instead of searching in other regions where the stars most certainly will not be present. In addition, by using the information about the stars that is in the catalog, it is avoided that other objects like satellites can be identified as stars. Yet in addition, the method for attitude determination may be faster by using an attitude hint to start searching a portion of the catalog and projecting it over the sensor or camera to know where the stars may be, instead of first capturing an image and then searching the entire catalog to find a match.

CONCLUSION

The subject matter described herein can be embodied in systems, apparatus, methods, and/or articles depending on the desired configuration. Although the disclosure uses language that is specific to structural features and/or methodological acts, the disclosure of the systems, methods and devices described herein is not limited to the specific features or acts described. Rather, the specific features and acts are disclosed as illustrative forms of implementing the subject matter described herein. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. An imaging system for attitude determination, the imaging system comprising:

one or more imaging sensors comprising a plurality of pixel sensors and configured to capture at least one image having a plurality of pixels; and one or more processors configured to:

instruct the one or more imaging sensors to capture the at least one image having a plurality of pixels;

filter the at least one image, based at least in part on statistical-based techniques, to detect one or more centroid candidates, by filtering some or all the pixels of the plurality of pixels of the at least one image based at least in part on a hypothesis test;

identify, based at least in part on the one or more centroid candidates, one or more stars;

generate a mapping between the one or more stars and the one or more centroid candidates; and estimate an attitude, based on the mapping;

wherein the hypothesis test comprises computing statistical values in a window of the at least one image to test one or more hypotheses to determine the one or more centroid candidates, the window having a size of one or more pixels, and determining whether a likelihood metric is above, equal or below a threshold value; and wherein the threshold value is a variable threshold value adjusted based on a priori information;

wherein the window is slid over the at least one image to compute the statistical values in selected one or more sub-regions of the at least one image;

wherein the one or more sub-regions are determined based at least in part on a hint, the hint including an attitude hint or a centroid hint; and wherein the attitude hint is determined by the steps comprising:

before capturing the at least one image, capturing a plurality of subsequent images;

determining, based at least in part on a first image and a second image of the plurality of subsequent images, a first order angular velocity estimate; and determining, based at least in part upon the first order angular velocity estimate, an attitude estimate associated to the at least one image, to obtain the attitude hint.

2. The imaging system according to claim 1, wherein the one or more processors are configured to slide the window over the at least one image to compute the statistical values in all the pixels of the at least one image, and wherein preferably the one or more processors are configured to slide the window over the at least one image from a first position to a second position by one pixel at a time such that the relative displacement from the first position to the second position is the size of a pixel or a multiple thereof, and the one or more pixels of the window in the first position overlap by at least one pixel the pixels of the window in the second position.

3. The imaging system according to claim 1, wherein, for computing the statistical values, the one or more processors are further configured to perform at least one of: computing a likelihood of occurrence of a hypothesis, or computing the likelihood metric.

4. The imaging system according to claim 3, wherein computing the likelihood metric comprises weighting or relating the likelihood of occurrence of two or more hypotheses.

5. The imaging system according to claim 3, wherein computing the likelihood of occurrence of a hypothesis comprises:

setting a hypothesis model;

estimating statistical parameters of the hypothesis model based at least in part on a pixel parameter, wherein the statistical parameters are estimated so that the hypothesis has a maximum likelihood of occurrence;

computing the likelihood of occurrence of the hypothesis based at least in part on the statistical parameters.

6. The imaging system according to claim 5, wherein a first hypothesis is set as a null hypothesis and is modeled based on a statistical distribution; and a second hypothesis is set as an alternative hypothesis and is modeled based at least in part on a star characteristic including star shape, star quantity or star magnitude, wherein preferably the statistical distribution represents image noise and comprises at least one of a Gaussian distribution, a Poisson distribution, or a statistical distribution modeling stray light; and wherein preferably a model of the second hypothesis comprises a combination of a function representing a star shape and a statistical distribution representing image noise; the function representing the star shape comprising at least one of a Gaussian bell, a saturated Gaussian bell, a sinc function, a square waveform, a rectangular waveform, a sawtooth waveform, or a triangle waveform.

7. The imaging system according to claim 6, wherein the one or more processors are further configured to compute the likelihood metric, comprising calculating a quotient of the likelihood of occurrence of the second hypothesis divided by the likelihood of occurrence of the first hypothesis.

8. The imaging system according to claim 1, wherein the variable threshold value is different for different pixels or windows in the at least one image.

9. The imaging system according to claim 8, wherein the variable threshold value is determined based at least in part on a Bayesian interpretation associated with the likelihood metric, and wherein computing the likelihood metric comprises calculating a quotient between two a priori probabilities associated with the presence of a centroid candidate.

10. The imaging system according to claim 1, wherein the imaging system is all or partially on-board a movable platform including a manned or unmanned aerial, spatial, maritime or terrestrial vehicle.

11. A method for attitude determination of a vehicle, the method comprising:

detecting one or more centroid candidates in at least one image by filtering the at least one image based at least in part on statistical-based techniques, wherein the filtering comprises filtering some or all of the pixels of a plurality of pixels of the at least one image based at least in part on a hypothesis test;

matching the one or more centroid candidates to astronomical objects to obtain matches;

determining, based on the matches, a transformation factor; and determining, based on the transformation factor, the attitude of the vehicle;

wherein the hypothesis test comprises computing statistical values in a window of the at least one image to test one or more hypotheses to determine the one or more centroid candidates, the window having a size of one or more pixels, and determining whether a likelihood metric is above, equal or below a threshold value;

wherein the threshold value is a variable threshold value adjusted based on a priori information;

wherein the window is slid over the at least one image to compute the statistical values in selected one or more sub-regions of the at least one image;

wherein the one or more sub-regions are determined based at least in part on a hint, the hint including an attitude hint or a centroid hint; and wherein the attitude hint is determined by the steps comprising:

before capturing the at least one image, capturing a plurality of subsequent images;

determining, based at least in part on a first image and a second image of the plurality of subsequent images, a first order angular velocity estimate; and determining, based at least in part upon the first order angular velocity estimate, an attitude estimate associated to the at least one image, to obtain the attitude hint.

12. The method according to claim 11, further comprising at least one of removing background noise from the at least one image, clustering pixels from the at least one image to obtain clusters, and determining cluster centroids to obtain centroid candidates.

13. The method according to claim 11, further comprising capturing at least one image by an imaging system on-board the vehicle, the vehicle a manned or unmanned aerial, spatial, maritime or terrestrial vehicle.

14. The method according to claim 11, wherein matching the one or more centroid candidates to astronomical objects to obtain matches comprises searching for the astronomical objects in an astronomical objects catalog, and the method further comprises predicting, based on the attitude hint, a position of the astronomical objects in a subsequently captured image, to obtain one or more centroid hints for the subsequently captured image.

15. The method according to claim 14, wherein the method further comprises searching for the matches in a portion of the astronomical objects catalog based, at least in part, on the one or more centroid hints and on a field-of-view of an imaging sensor, the imaging sensor configured to capture the at least one image and the subsequently captured image.

16. The method according to claim 14, wherein the method further comprises:

predicting, based on the one or more centroid hints, additional astronomical objects within a field-of-view of an imaging sensor;

projecting the additional astronomical objects into the field-of-view of the imaging sensor;

and matching the one or more centroid candidates to the additional astronomical objects to obtain matches.

* * * * *